United States Patent
Lewis et al.

(10) Patent No.: US 8,873,669 B1
(45) Date of Patent: Oct. 28, 2014

(54) ADAPTABLE CODEC FOR SELECTING ENCODING SCHEME BASED ON QUALITY OF EXPERIENCE

(75) Inventors: Larry DeWayne Lewis, Plano, TX (US); Ravi Subramanian, Richardson, TX (US)

(73) Assignee: Apple Inc., Cupertino, CA (US)

( * ) Notice: Subject to any disclaimer, the term of this patent is extended or adjusted under 35 U.S.C. 154(b) by 2165 days.

(21) Appl. No.: 11/017,317

(22) Filed: Dec. 20, 2004

(51) Int. Cl.
*H04L 27/00* (2006.01)

(52) U.S. Cl.
USPC .............. 375/295; 327/291; 332/106; 341/20

(58) Field of Classification Search
USPC .................................. 375/318, 310
See application file for complete search history.

(56) References Cited

U.S. PATENT DOCUMENTS

| | | | | |
|---|---|---|---|---|
| 4,829,299 A * | 5/1989 | Mandell | ........................ | 341/77 |
| 5,854,811 A * | 12/1998 | Sasaki | .......................... | 375/296 |
| 6,047,322 A * | 4/2000 | Vaid et al. | ..................... | 709/224 |
| 6,690,651 B1 * | 2/2004 | Lamarque et al. | ............ | 370/252 |
| 6,934,383 B2 * | 8/2005 | Kim | .............................. | 379/392 |
| 7,167,451 B1 * | 1/2007 | Oran | ............................. | 370/252 |
| 7,245,710 B1 * | 7/2007 | Hughes | .................... | 379/202.01 |
| 2002/0087964 A1 * | 7/2002 | Sullivan | ........................ | 717/174 |
| 2002/0105917 A1 * | 8/2002 | Rabipour et al. | ............. | 370/260 |
| 2003/0009248 A1 * | 1/2003 | Wiser et al. | ...................... | 700/94 |
| 2004/0106403 A1 * | 6/2004 | Mori et al. | .................. | 455/426.2 |
| 2004/0170164 A1 * | 9/2004 | LeBlanc et al. | ................ | 370/389 |
| 2004/0179515 A1 * | 9/2004 | Kamani et al. | ................ | 370/352 |
| 2005/0025254 A1 * | 2/2005 | Awad et al. | .................... | 375/295 |
| 2005/0076136 A1 * | 4/2005 | Cho et al. | ....................... | 709/231 |
| 2005/0120380 A1 * | 6/2005 | Wolfe | ........................... | 725/100 |
| 2005/0265304 A1 * | 12/2005 | Kim et al. | ..................... | 370/349 |
| 2007/0032345 A1 * | 2/2007 | Padmanabhan et al. | ......... | 482/8 |
| 2008/0282080 A1 * | 11/2008 | Hyndman et al. | ............ | 713/150 |
| 2009/0042557 A1 * | 2/2009 | Vardi et al. | ................. | 455/422.1 |
| 2009/0073965 A1 * | 3/2009 | Dowling et al. | .............. | 370/352 |

* cited by examiner

*Primary Examiner* — Shuwang Liu
*Assistant Examiner* — Gina McKie
(74) *Attorney, Agent, or Firm* — Meyertons, Hood, Kivlin, Kowert & Goetzel, P.C.

(57) ABSTRACT

The present invention provides an adaptable codec for use in a communication system. The adaptable codec is capable of encoding a digital stream to be transmitted according to any one of a number of encoding schemes. A particular encoding scheme may be selected based on information received from a network entity that is separate from the communication system, a user associated with the communication system, a remote communication system with which communications are established, or a combination thereof. Once a particular encoding scheme is selected, an encoder will encode the digital stream to be transmitted, and a packet processor will create packets from the encoded digital stream. The selection of an encoding scheme will generally correspond to a desired quality of experience level.

21 Claims, 2 Drawing Sheets

ADAPTABLE CODEC FOR SELECTING ENCODING SCHEME BASED ON QUALITY OF EXPERIENCE

FIELD OF THE INVENTION

The present invention relates to communications, and in particular to providing an adaptable codec to facilitate communications according to a desired quality of experience level.

BACKGROUND OF THE INVENTION

With the continuing expansion of packet-based communications and the ability to support audio, video, and voice using such communication techniques, there is a need to manage communication resources. These resources need to be managed to ensure quality of experience (QoE) levels for subscribers. Ensuring QoE levels not only requires assurance that a sufficient amount of resources is available for a subscriber's communications, but also ensures that a subscriber is not allocated more resources than are deserved.

For current real-time high fidelity audio offerings over packet networks, these audio sessions often suffer from extreme latency as well as excessive bandwidth consumption. There are currently no mechanisms to control the QoE levels for the participating endpoints, based on the associated subscription agreements. Generally, the endpoint cannot be relied upon to ensure that subscriber agreements are followed. Thus, there is a need for a mechanism to allow network policy servers to be able to control network resources such that QoE levels are maintained as desired. Since QoE levels may change from one session to another as well as from one subscriber to another, there is a need for a way to control QoE levels based on network constraints and subscriber agreements. There is a further need to provide these solutions in an efficient and effective manner.

SUMMARY OF THE INVENTION

The present invention provides an adaptable codec for use in a communication system. The adaptable codec is capable of encoding a digital stream to be transmitted according to any one of a number of encoding schemes. A particular encoding scheme may be selected based on information received from a network entity that is separate from the communication system, a user associated with the communication system, a remote communication system with which communications are established, or a combination thereof. Once a particular encoding scheme is selected, an encoder will encode the digital stream to be transmitted, and a packet processor will create packets from the encoded digital stream. The selection of an encoding scheme will generally correspond to a desired quality of experience level.

The communication system may also include a variable passband filter, which is also controlled based on the selected encoding scheme and is used to filter the digital stream prior to encoding. Further, the packet processor may be controlled based on the selected encoding scheme. The communication system may also include a feedback controller to reduce feedback and echo from received information. In general, incoming packets are processed to provide a received digital stream, which is decoded. The decoded digital stream and the digital stream to be transmitted are provided to the feedback controller, which will create a cancellation signal to be applied to the decoded digital stream to remove feedback or echo effects within the decoded digital stream. The feedback controller may also use latency information to assist in creating the cancellation signal as well as determining where in the decoded digital stream the cancellation signal should be applied.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides an adaptable codec, which is capable of controlling encoding to provide a desired quality of experience (QoE) level based on user input, instructions from a network server, instructions from a remote communication client, or a combination thereof, for any given communication session. The codec may be used in any type of communication client to encode and decode data, audio, video, and voice. The present invention is particularly beneficial for high fidelity encoding and decoding, such as that used in high quality audio applications. As such, the codec may be implemented in various types of communication clients, which are capable of facilitating various types of communications. Prior to delving into the details of the present invention, an overview of a basic communication environment in which the present invention may be practiced is provided, followed by an overview of a communication client including an exemplary adaptable codec.

Figure 1:
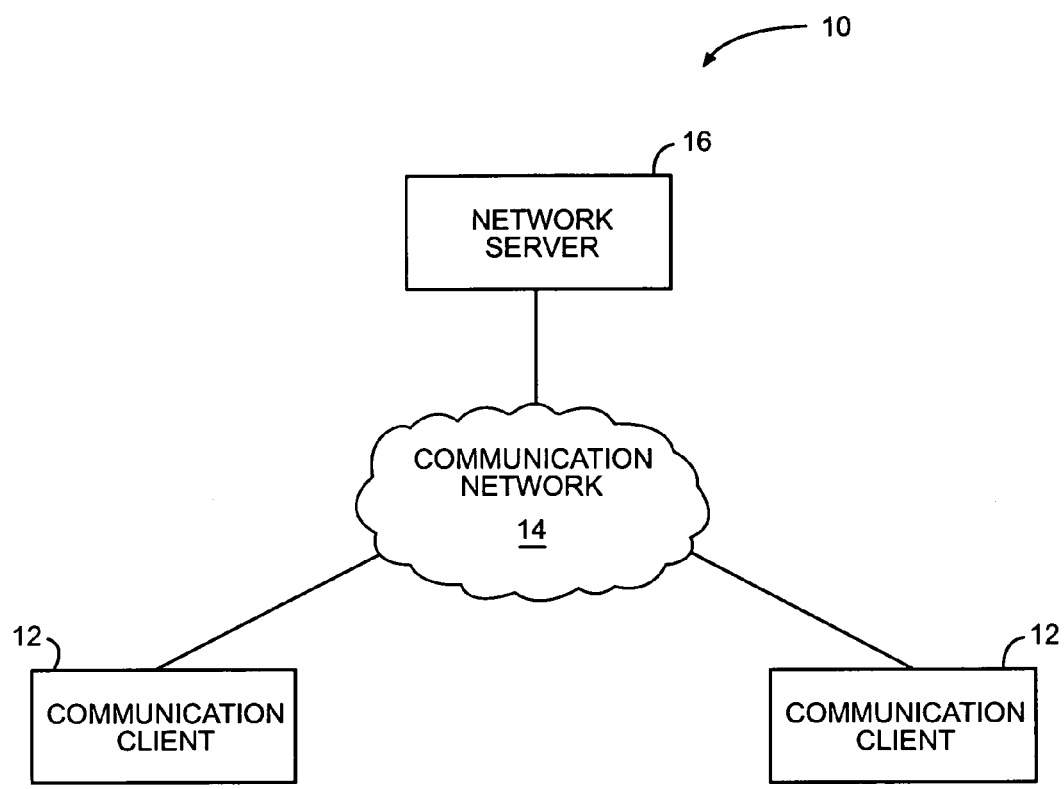
FIG. 1 is a block representation of a communication environment according to one embodiment of the present invention.

With reference to FIG. 1, a communication environment 10 includes multiple communication clients 12, which are capable of communicating with each other over a communication network 14, which may include the Internet, public switched telephone network (PSTN), cellular network, and wired or wireless local area networks. The communication clients 12 may include an adaptable codec, which is configurable based on the appropriate QoE level as dictated by the associated user, a remote communication client 12, a network server 16, or a combination thereof. Different QoE levels may be based on different data rates, bandwidth allocations, and compression rates or techniques. Lower QoE levels may require higher compression and lower data rates, which result in lower required bandwidth. Higher QoE levels may dictate lesser compression and higher data rates, which may require higher bandwidth allocations. Changes in codec operation may occur from one communication session to another, as well as within a single communication session.

As noted, various entities may figure into a selected QoE level. For example, the associated user may select a desired audio quality, which will dictate the QoE level. Further, the abilities of the remote communication client may come into play when selecting a QoE level that is acceptable, and the network server 16 may dictate the QoE level based on the QoE level to which the local remote subscriber has subscribed. The type of content being transported may also bear on the QoE level for the session. Notably, QoE levels may be based on or relate to quality of service (QoS) parameters.

Figure 2:
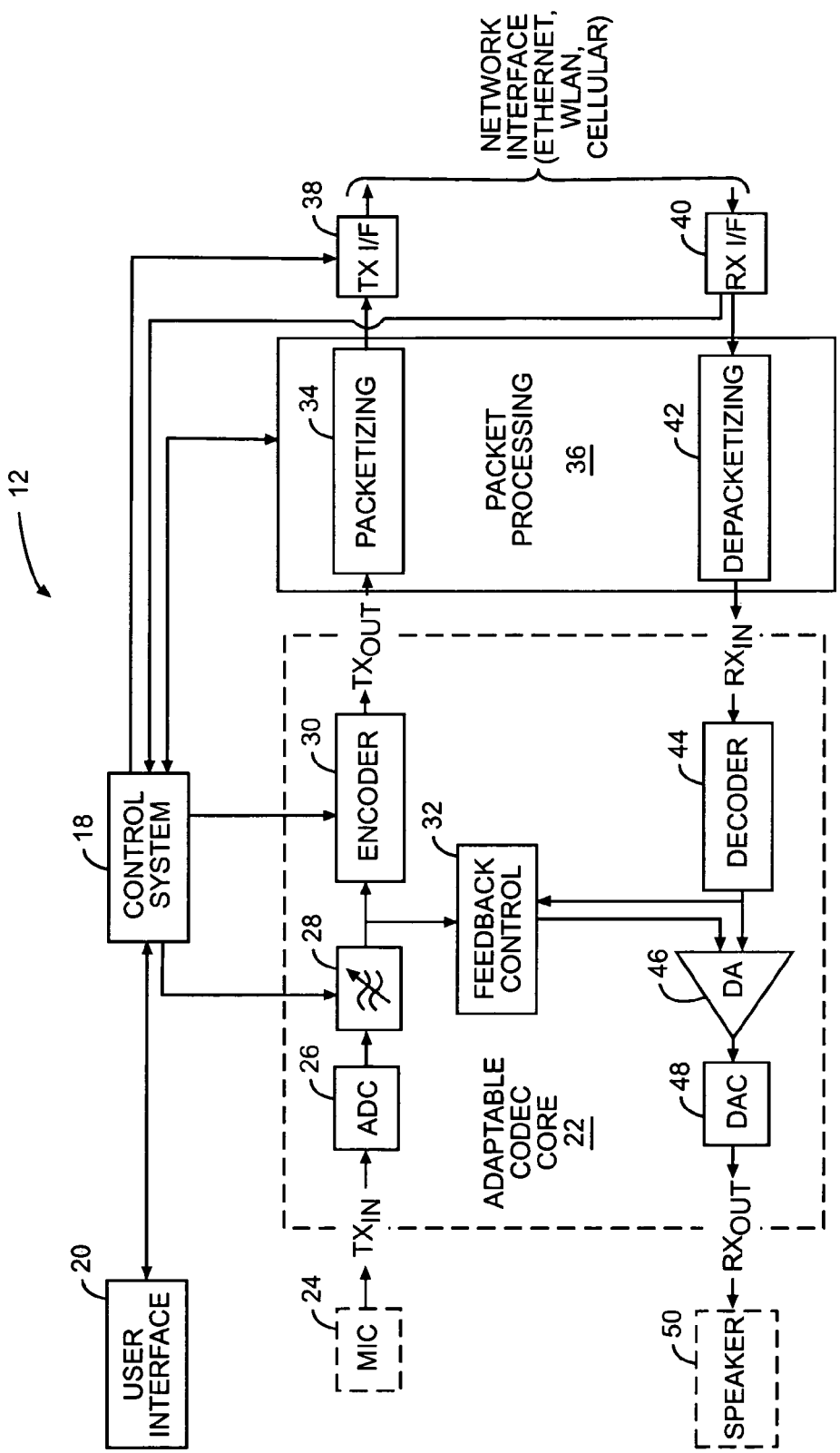
FIG. 2 is a block representation of a communication client including an adaptable codec according to one embodiment of the present invention.

Turning now to FIG. 2, a high level block diagram of a communication client 12 is illustrated to provide an adaptable codec. As illustrated, the communication client 12 is capable of facilitating audio or voice communications, and is centered about a control system 18, a user interface 20, and an adaptable codec core 22. The functionalities of the respective elements of the communication client 12 are initially described in relation to transmit and receive paths, respectively.

Initially, information is provided to be encoded and transmitted. In this embodiment, the information is provided by a microphone (MIC) 24, wherein the information is an analog audio signal (including voice) to be transmitted ($TX_{IN}$). The analog signal is presented to an analog-to-digital converter (ADC) 26, wherein the analog signal is digitized and passed through a variable passband filter 28. The variable passband filter 28 has a variable passband, which is controlled by the control system 18 based on the selective QoE level. For example, if the QoE level dictates an audio signal having a bandwidth of 8 kHz, the passband for the variable passband filter may be set to 16 kHz to comply with Nyquist oversampling. For higher quality audio requiring a full 20 kHz bandwidth, the passband may be set to pass information for a 44.1 kHz, 48 kHz, or 96 kHz sampling rate. The digitized and filtered signal is then sent to an encoder 30 for encoding, as well as to a feedback control function 32, which will be described further below.

The encoder 30 will encode the digitized and filtered signal according to a desired coding protocol, such as the Ogg Vorbis coding protocol, which is often used for high fidelity encoding and decoding. The encoder 30 is capable of using different types of encoding, which are selectable based on instructions received from the control system 18. The particular encoding selected by the control system 18 for the encoder 30 will correspond to the passband selected for the variable passband filter 28.

When the signal to be transmitted is a continuous signal, the output of the encoder 30 ($TX_{OUT}$) is a continuous stream of digital samples. In this embodiment, the stream of digital samples is a pulse code modulated (PCM) stream. For transmission across the communication network 14, the stream of digital samples is broken into groups, which become the payload for packets to be sent over the communication network 14. The payloads are associated with an appropriate header to form the packets by a packetizing function 34 in a packet processing block 36. The packets are sent to a transmit interface (TX I/F) 38 and forwarded over the communication network 14. Notably, the network interface may be an Ethernet interface, wired or wireless local area network interface, cellular network interface, or other appropriate network interface used to facilitate packet-based communications.

For incoming packets, the packets are received at a receive interface (RX I/F) 40 and sent to a depacketizing function 42 in the packet processing block 36. The incoming packets are generally buffered and placed in their appropriate temporal sequence. The headers are stripped from the packets and the payloads are then provided to a decoder 44 in a continuous stream of digital samples ($RX_{IN}$). The decoder 44 will decode the incoming sample stream and provide the decoded sample stream to a differential amplifier (DA) 46 as well as to the feedback control function 32.

The feedback control circuitry 32 is used to minimize feedback and provide echo cancellation for echo that may result from information provided to a remote communication client 12 being injected in the information provided by the remote communication client 12. In one embodiment, the packet processing function 36 will cooperate with the control system 18 to determine the relative latency associated with the communications with the remote communication client 12. As such, the feedback control function 32 has an estimation of the time it takes for a packet to be sent to the remote communication client 12 and any resultant feedback or echoes being returned. Armed with the latency estimation, the feedback control function 32 can determine a cancellation signal that represents any echo or feedback components in the received sample stream. The cancellation signal and the received sample stream are provided to the differential amplifier function 46, which operates to subtract the cancellation signal from the received sample stream, wherein the resultant sample stream is sent to a digital-to-analog converter (DAC) 48, which provides an analog output signal ($RX_{OUT}$) that may be amplified and sent to a speaker 50 or appropriate storage medium.

The feedback control function 32 can use the latency estimation to provide a general correlation between any echo or feedback information in the received sample stream and the digitized and filtered signal to be transmitted. At this point, characteristics of the digitized and filtered signal can be matched with the incoming sample stream. Next, the cancellation signal can be determined based on the digitized and filtered signal and the incoming sample stream. Those skilled in the art will recognize numerous ways to detect the presence of a portion of a transmitted signal in a receive signal to create a cancellation signal, which is applied to the incoming sample stream to remove echoes and feedback. In one embodiment, the differential amplifier 46 may be configured to hold the incoming sample stream from the decoder 44 until the corresponding cancellation signal is received from the feedback control system 32. Further, latency estimations may be determined using a number of techniques, including sending a latency packet or ping to the remote communication client 12, which will immediately respond with an appropriate response. The time between sending the latency signal and receiving the appropriate response corresponds to the latency estimation. Latency estimation may take place on a regular basis such that the latency estimations reflect current network conditions.

In general, the decoder function 44 does not need to be controlled in the same manner as the encoder 30, since the control system 18 will already have negotiated the appropriate decoding with the remote communication client 12 when the communication session was established. However, the control system 18 may take into consideration numerous factors when determining how to control the passband for the variable passband filter 28, the encoder 30, and the packet processing block 36. As indicated, the user (or subscriber), the network server 16, the remote communication client 12, or a combination thereof, may play a part in determining the appropriate QoE level. The QoE level may dictate the passband for the variable passband filter 28, the encoding technique provided by the encoder 30, and perhaps packet processing techniques provided by the packet processing block 36. For example, the QoE level may dictate packet size, the frequency at which packets are transmitted, how packets are routed, and the packet format.

Accordingly, the control system 18 may receive input from the user via a user interface 20, which may include a display and an input device, such as a mouse, keyboard, touchscreen, or the like. The control system 18 may receive information from the network server 16 identifying or bearing on the QoE level to use for a particular communication session, a type of communication session, or all communication sessions. Further, control information may also be received from the remote communication client 12 when the communication session is being established or during the communication session. Accordingly, the control system 18 can effectively control the variable passband filter 28, the encoder 30, and perhaps the packet processing function 36 to provide an adaptable codec, which can support different QoE levels having different transmission characteristics and requirements.

Those skilled in the art will recognize improvements and modifications to the preferred embodiments of the present invention. For example, the adaptable codec functionality may be presented in various types of terminals, including wired and wireless telephones, personal computers, personal digital assistants, digital music players, such as mp3 and CD players, and other professional consumer electronics. Although the invention is particularly beneficial for audio and voice applications, the invention is also beneficial for data and video applications, especially those where the associated information is streamed to or from a communication client. All such improvements and modifications are considered within the scope of the concepts disclosed herein and the claims that follow.

What is claimed is:

1. An apparatus for use in a communication network for selecting an encoding scheme for a communication session, the apparatus comprising:
   an encoder adapted to encode a digital stream to be transmitted according to one of a plurality of encoding schemes to provide an encoded digital stream;
   a packet processor adapted to create packets to be transmitted from the encoded digital stream;
   at least one communication interface adapted to transmit the packets to be transmitted over the communication network and receive control information from a network server, the control information bearing on a desired quality of experience level to be used for the communication session; and
   a control system adapted to instruct the encoder to select the one of the plurality of encoding schemes based on the control information, wherein the control information is used to select the encoding scheme that corresponds to the desired quality of experience level.

2. The apparatus of claim 1 wherein the control system is further adapted to receive additional control information from a user via a user interface associated with the control system and select the one of the plurality of encoding schemes based on the additional control information as well as the control information from the network server.

3. The apparatus of claim 1 wherein the control system is further adapted to receive additional control information from a remote communication client receiving the packets to be transmitted and select the one of the plurality of encoding schemes based on the additional control information as well as the control information from the network server.

4. The apparatus of claim 1 wherein the control system is further adapted to:
   receive first additional control information from a user via a user interface associated with the control system;
   receive second additional control information from a remote communication client receiving the packets to be transmitted; and
   select the one of the plurality of encoding schemes based on the first and second additional control information as well as the control information from the network server.

5. The apparatus of claim 1 further comprising a variable passband filter having a variable passband and adapted to filter the digital stream prior to encoding.

6. The apparatus of claim 5 wherein the control system is further adapted to instruct the variable passband filter to set the variable passband based on the control information.

7. The apparatus of claim 1 wherein the control system is further adapted to instruct the packet processor to create the packets to be transmitted based on the control information.

8. The apparatus of claim 1 wherein the control system is further adapted to effect transmission of the packets to be transmitted based on the control information.

9. The apparatus of claim 1 wherein the packet processor is further adapted to receive transmitted packets and create a received digital stream, and further comprising a decoder adapted to decode the received digital stream to provide a decoded digital stream.

10. The apparatus of claim 9 further comprising a feedback controller adapted to receive the digital stream to be transmitted and the decoded digital stream and create a cancellation signal for canceling feedback contained within the decoded digital stream based on the digital stream to be transmitted and the decoded digital stream.

11. The apparatus of claim 10 further comprising a differential amplifier adapted to receive the decoded digital stream and the cancellation signal and apply the cancellation signal to the decoded digital stream to cancel the feedback contained within the decoded digital stream.

12. The apparatus of claim 10 wherein the feedback controller is adapted to receive a latency signal bearing on latency associated with the communication session for the packets to be transmitted and create the cancellation signal based on the latency signal.

13. The apparatus of claim 1 wherein the desired quality of experience level is provided for the communication session over the communication network.

14. The apparatus of claim 1 wherein there are a plurality of quality of experience levels and each quality of experience level is associated with a different one of the group consisting of bit rate and bandwidth.

15. The apparatus of claim 14 wherein the communication session is an audio session.

16. The apparatus of claim 1 wherein the digital stream is a stream of digital samples of an analog signal.

17. A method for selecting an encoding scheme for a communication session over a communication network comprising:
   encoding a digital stream to be transmitted according to one of a plurality of encoding schemes to provide an encoded digital stream;
   creating packets to be transmitted from the encoded digital stream;
   transmitting the packets to be transmitted over the communication network;

receiving control information from a network server, the control information bearing on a desired quality of experience level to be used for the communication session; and instructing an encoder to select the one of the plurality of encoding schemes based on the control information, wherein the control information is used to select the encoding scheme that corresponds to the desired quality of experience level.

18. The method of claim 17 further comprising receiving additional control information from a user via a user interface and selecting the one of the plurality of encoding schemes based on the additional control information as well as the control information from the network server.

19. The method of claim 17 further comprising receiving additional control information from a remote communication client receiving the packets to be transmitted, and selecting the one of the plurality of encoding schemes based on the additional control information as well as the control information from the network server.

20. The method of claim 17 further comprising:
receiving first additional control information from a user via a user interface associated with the control system;
receiving second additional control information from a remote communication client receiving the packets to be transmitted; and
selecting the one of the plurality of encoding schemes based on the first and second additional control information as well as the control information from the network server.

21. The apparatus of claim 1, wherein the network server is separate from the communication network.

* * * * *